United States Patent
Bouby et al.

(10) Patent No.: US 11,235,365 B2
(45) Date of Patent: Feb. 1, 2022

(54) METHOD FOR MEASURING THE FLATNESS OF A METAL PRODUCT AND ASSOCIATED DEVICE

(71) Applicant: CLECIM S.A.S., Savigneux (FR)

(72) Inventors: Bastien Bouby, Saint Etienne (FR); Dominique Tellier, Saint Etienne (FR); Florian Turchet, Saint Chamond (FR)

(73) Assignee: CLECIM S.A.S.

(*) Notice: Subject to any disclaimer, the term of this patent is extended or adjusted under 35 U.S.C. 154(b) by 450 days.

(21) Appl. No.: 15/773,383

(22) PCT Filed: Nov. 7, 2016

(86) PCT No.: PCT/EP2016/076843
§ 371 (c)(1),
(2) Date: May 3, 2018

(87) PCT Pub. No.: WO2017/080955
PCT Pub. Date: May 18, 2017

(65) Prior Publication Data
US 2018/0318895 A1 Nov. 8, 2018

(30) Foreign Application Priority Data
Nov. 10, 2015 (EP) .................................. 15290286

(51) Int. Cl.
*B21B 38/02* (2006.01)
*G01B 5/28* (2006.01)
*G01B 21/30* (2006.01)

(52) U.S. Cl.
CPC .............. *B21B 38/02* (2013.01); *G01B 5/285* (2013.01); *G01B 21/30* (2013.01); *B21B 2263/04* (2013.01)

(58) Field of Classification Search
CPC ..... B21B 38/02; B21B 2263/04; G01B 5/285; G01B 21/30
See application file for complete search history.

(56) References Cited

U.S. PATENT DOCUMENTS 5,964,114 A * 10/1999 Noe ........................ B21B 37/28
72/11.7
6,070,472 A 6/2000 Kipping et al. ................ 73/829
(Continued)

FOREIGN PATENT DOCUMENTS

CN 1388354 A 1/2003
CN 1467043 A 1/2004
(Continued)

OTHER PUBLICATIONS

Molleda, J.; Usamentiaga, R.; Garcia, D.F. On-Line Flatness Measurement in the Steelmaking Industry. Sensors 2013, 13, 10245-10272. (Year: 2013).*
(Continued)

*Primary Examiner* — Omar F Fernandez Rivas
*Assistant Examiner* — Pursottam Giri
(74) *Attorney, Agent, or Firm* — Ostrolenk Faber LLP

(57) ABSTRACT

A method and a device that performs the method for measuring the flatness of a metal product traveling on a path, the method includes measuring a first longitudinal tension measurement value (T1) with a measuring roller, determining a model of stress over the thickness of the metal product as a function of plastic or elastoplastic deformation of the product, calculating a correction factor for the longitudinal deformation according to the stress model, calculating a corrective value (T1', T2') for the first longitudinal tension measurement value (T1) at at least one evaluation point (M1, M2) as a function of the longitudinal deformation correction
(Continued)

factor (Z1), and calculating a corrected flatness measurement value (PC) at at least one of the evaluation points.

12 Claims, 2 Drawing Sheets

(56) References Cited

U.S. PATENT DOCUMENTS

| | | | | |
|---|---|---|---|---|
| 6,164,104 | A * | 12/2000 | Noe | B21B 38/02 |
| | | | | 72/12.3 |
| 6,199,418 | B1 * | 3/2001 | Tezuka | B21B 37/28 |
| | | | | 72/11.7 |
| 6,336,350 | B1 | 1/2002 | Klein | 72/240 |
| 6,382,153 | B1 | 5/2002 | Rohe | |
| 6,722,194 | B2 | 4/2004 | Malard et al. | 73/159 |
| 6,729,757 | B2 | 5/2004 | Faure et al. | 374/50 |
| 6,853,927 | B2 | 2/2005 | Noe | 702/41 |
| 8,127,580 | B2 | 3/2012 | Polatidis | 72/7.4 |
| 8,176,762 | B2 * | 5/2012 | Malik | B21B 37/28 |
| | | | | 72/9.1 |
| 10,081,041 | B2 | 9/2018 | Burger | |
| 2005/0285059 | A1 * | 12/2005 | Gerber | G01N 21/89 |
| | | | | 250/559.45 |
| 2008/0271508 | A1 * | 11/2008 | Kruger | B21B 37/28 |
| | | | | 72/12.3 |
| 2010/0249973 | A1 * | 9/2010 | Bergsten | B21B 37/28 |
| | | | | 700/104 |
| 2012/0174643 | A1 * | 7/2012 | Noe | B21D 1/05 |
| | | | | 72/164 |
| 2015/0013417 | A1 * | 1/2015 | Noe | B21D 1/05 |
| | | | | 72/160 |
| 2015/0354948 | A1 * | 12/2015 | Burger | G01B 11/306 |
| | | | | 73/849 |

FOREIGN PATENT DOCUMENTS

| | | |
|---|---|---|
| CN | 101312797 A | 11/2008 |
| CN | 102548681 A | 7/2012 |
| CN | 103537485 A | 1/2014 |
| DE | 10 2009 060 243 A1 | 6/2011 |
| EP | 0 858 845 A1 | 8/1998 |
| EP | 1 199 543 A1 | 4/2002 |
| EP | 1 249 683 A2 | 10/2002 |
| EP | 1249583 A2 | 10/2002 |
| EP | 1 199 543 B1 | 9/2009 |
| FR | 1 469 660 A | 2/1967 |
| JP | H02-207909 A | 8/1990 |
| JP | 2001-071013 A | 3/2001 |
| JP | 2010-266255 A | 11/2010 |
| RU | 2189875 C2 | 9/2002 |
| SU | 1186305 A1 | 10/1985 |
| SU | 1260673 A1 | 9/1986 |
| SU | 1694270 A1 | 11/1991 |
| WO | WO 2014/090555 A1 | 6/2014 |

OTHER PUBLICATIONS

Lobo, H. and J. Hurtado. "Characterization and Modeling of Non-Linear Behavior of Plastics." (2006).*
Lobo, H. and J. Hurtado. "Characterization and Modeling of Non-Linear Behavior of Plastics." (2006). (Year: 2006).*
Ghosh, S., Li, M., Gardiner, D., 2004. A computational and experimental study of cold rolling of aluminum alloys with edge cracking. Journal of Manufacturing Science and Engineering—Transactions of the Asme 126(1), 74-82. (Year: 2004).*
International Search Report dated Jan. 24, 2017 in corresponding PCT International Application No. PCT/EP2016/076843.
Written Opinion dated Jan. 24, 2017 in corresponding PCT International Application No. PCT/EP2016/076843.
European Search Report dated Jun. 1, 2016 in corresponding European Patent Application No. 15290286.2.
Chinese Office Action, dated Sep. 4, 2019, issued in corresponding Chinese Patent Application No. 201680065722.2. English translation. Total 23 pages.
Japanese Office Action, dated Aug. 26, 2019, issued in corresponding Japanese Patent Application No. 2018-524485. Including English Translation. Total 7 pages.

* cited by examiner

METHOD FOR MEASURING THE FLATNESS OF A METAL PRODUCT AND ASSOCIATED DEVICE

CROSS-REFERENCE TO RELATED APPLICATIONS

The present application is a 35 U.S.C. §§ 371 national phase conversion of PCT/EP2016/076843, filed Nov. 7, 2016, which claims priority of European Patent Application No. 15290286.2, filed Nov. 10, 2015, the contents of which are incorporated by reference herein. The PCT International Application was published in the French language.

FIELD OF THE INVENTION

The present invention relates to a method and to an associated device for measuring the flatness of a metal product.

TECHNICAL BACKGROUND

For many years, methods and devices for measuring the flatness of a metal product have been known in the prior art.

In particular, the Applicant Company already developed a method and a device for measuring the flatness of a metal product in the form of a strip traveling under tension over a flatness measurement assembly of the type that deflects the product. This ideally is comprised of at least one measuring roller (for example, a roller known by the trade name Planicim®) that causes the product to be deflected in the direction of travel. The flatness measurement is taken by measuring the longitudinal tension over a deflection zone of the product. The Planicim® roller, or any other type of flatness measuring roller, measures the distribution of the tension across the width of a strip under tension and converts this measurement directly into a flatness deviation value (evaluated in units referred to as "IU"), equivalent to a notion without associated tension the flatness of the variation in length of a longitudinal fiber of the strip. This type of flatness measurement works well for products that have deformation properties of an elastic nature, such as a cold-rolled or cold-leveled metal strip. However, once the product has deformation properties of an at least plastic or elasto-plastic nature, for example a hot-rolled or hot-leveled product, it has been found that effects of the deformation of the strip over the roll lead to a complex stress profile. This skews the actual measurement of the flatness of the strip.

Document EP1199543B1 tackles this set of problems by citing document EP-A-0858845 which proposes placing a measuring roller in a hot-rolling line of a strip under tension. However, even in the case of a non-ferrous metal such as aluminum, the hot strip is at a high temperature and this causes disturbances in the measurements, for which compensation is needed. It is possible, for example, to calibrate the roller at various temperatures in order to make necessary corrections to the measurements as a function of the temperature of the strip. But, such calibration is not easily performed. To avoid such calibration, document EP1199543B1 provides a solution comprised of cooling the measuring roller. Although this advantageous solution helps to improve the intrinsic measurement of the roller, it nevertheless cannot effectively improve the measurement error associated with plastic or elastoplastic properties of a strip under tension deforming as it passes over an angular sector of the measuring roller.

SUMMARY OF THE INVENTION

It is an object of the present invention to propose a more exact method for measuring the flatness of a metal product in the form of a strip passing under tension over a flatness measurement assembly. That assembly is of the type that deflects the product, ideally comprising at least one measuring roller that causes the product to be deflected in the direction of travel. The flatness measurement is taken by measuring the longitudinal tension over a deflection zone of the product, the product having at least plastic or elastoplastic deformation properties.

A flatness measurement method is provided for measuring the flatness of a metal product in the form of a strip passing along a traveling path under tension over a flatness measurement assembly of the type that deflects the product. This comprises at least one measuring roller that causes the product to be deflected while traveling in the direction or path of travel. The flatness measurement is taken by measuring the longitudinal tension over a deflection zone of the product, wherein the product has at least plastic or elastoplastic deformation properties. The flatness measurement comprises the following steps:
 a first longitudinal tension measurement value is obtained by means of the measuring roller,
 a model of stress over the thickness of the strip is determined as a function of conditions of plastic or elastoplastic deformation of the product on the measuring roller in the deflection zone,
 a correction factor for the longitudinal deformation of the product is calculated according to the determined stress model,
 a corrective value for the first longitudinal tension measurement value is calculated at at least one evaluation point as a function of the longitudinal deformation correction factor,
 a corrected flatness measurement value is calculated at at least one of the evaluation points, taking the corrective value into consideration.

Also, a flatness measurement device for implementing the method is proposed.

The device measures the flatness of a metal product in the form of a strip moving along its traveling path under tension, wherein the product has at least plastic or elastoplastic deformation properties. The device comprises a flatness measurement assembly of the type that deflects the product. It ideally comprises at least one measuring roller that causes the product to be deflected on its traveling path in the longitudinal direction. It comprises a flatness measurement correction module to which at least one corrected flatness measurement value of the product is transmitted as it passes over at least the measuring roller. The corrected value is obtained by implementing the measurement method.

BRIEF DESCRIPTION OF THE DRAWINGS

A set of sub-claims also sets out advantages of the invention.

Exemplary embodiments and applications according to the invention are provided with the aid of the Figures.

DESCRIPTION OF EMBODIMENTS

Figure 1:
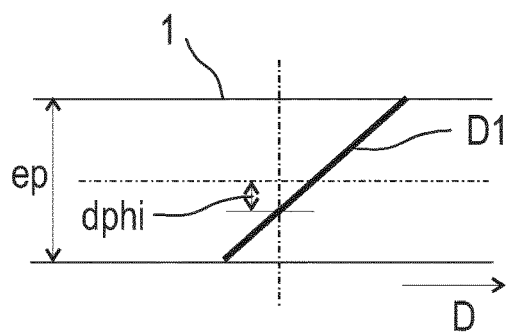
FIG. 1: is a profile of deformation along the thickness of a strip as it passes over a measuring roller.

FIG. 1 depicts a profile of the localized deformation (D1) along the thickness (ep) of a strip (1) at a point at which the strip passes, in a longitudinal direction (D), over a circumferential arc of the measuring roller (not shown in FIG. 1) causing the strip to be deflected in the direction of travel. This profile thus represents a theoretically linear state of deformation insofar as the longitudinal strands of strip furthest from the roller are stretched more than those closest to the roller which may also be compressed below a certain thickness "dphi".

Figure 2:
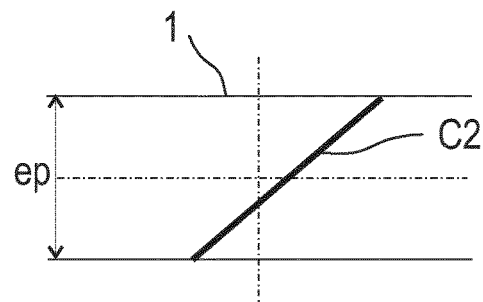
FIG. 2: is a profile of stress along the thickness of a strip of elastic type as it passes over the measuring roller.

In the manner of FIG. 1, FIG. 2 depicts a profile of the localized stress (C2) along the thickness of a strip of elastic type at a point at which it passes, in a longitudinal direction on a traveling path, over a circumferential arc of the measuring roller causing the strip to be deflected in the direction of travel. This profile thus represents a state of stress for a material having elastic mechanical properties, in which the stress is also linear insofar as the longitudinal strands of the strip of the roller experience tensile if not compressive stresses that are proportional to the deformations imposed (FIG. 1).

Figure 3:
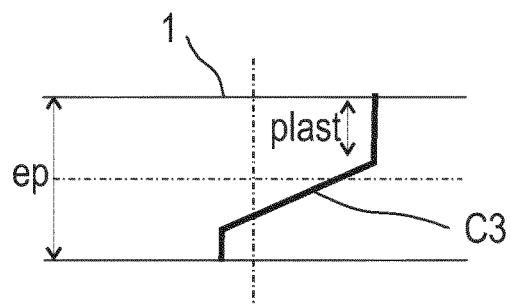
FIG. 3: is a profile of stress along the thickness of a strip of plastic or elastoplastic type as it passes over the measuring roller.

In a similar way to FIG. 2, FIG. 3 depicts a profile of the localized stress (C3) along the thickness of a strip for a material having mechanical properties, of the plastic and/or elastoplastic type, at a point at which it passes, in a longitudinal direction, over a circumferential arc of the measuring roller causing the strip to be deflected on the path in the direction of travel. Over an elastic central range, the stress is of the linear type as in FIG. 2. However, beyond a certain imposed-deformation threshold, for example if a strand is stretched further in the (plast) thickness domain, the stress becomes non-linear because of plastic-type deformation of the strip. In this particular domain, a measuring roller is therefore no longer able to measure stretching of a strand of strip by simply applying a proportionality ratio to a "strip-roller" tension measured by the roller. The flatness measurement is therefore subject to error as soon as the strip begins to exhibit at least a deformation behavior comparable to a plastic material under stress.

Figure 4:
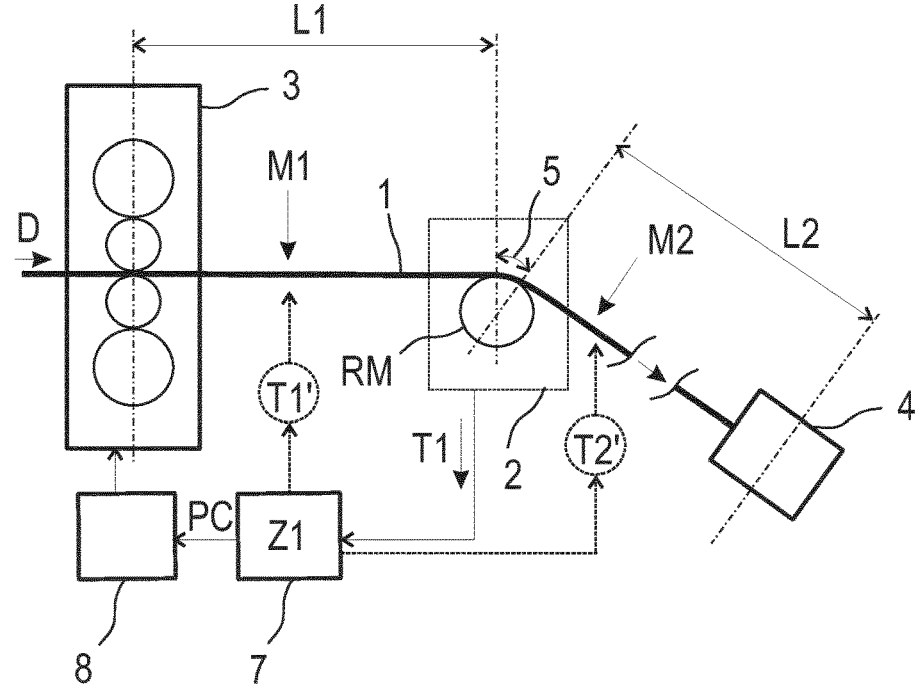
FIG. 4: shows a first embodiment for one implementation of the method according to the invention.

To this end, FIG. 4 shows a first device for the implementation of the method according to the invention.

This device is used for a method for measuring the flatness of a metal product (1) in the form of a strip passing (D) under tension over a flatness measurement assembly (2) of the type that deflects the product Ideally, it comprises at least one measuring roller (RM) that causes the product to be deflected in the direction of travel. The flatness measurement is taken by measuring the longitudinal tension over a deflection zone (5) of the product, wherein the product has at least plastic or elastoplastic deformation (D1) properties. The method is performed in that the flatness measurement comprises the following steps:

a first longitudinal tension measurement value (T1) is obtained, in a form referred to as state of flatness, by means of the measuring roller, a model of stress, such as one derived from the stress profile (C3) in FIG. 3, over the thickness of the strip is determined as a function of conditions of plastic or elastoplastic deformation of the product on the measuring roller in the deflection zone, a correction factor for the longitudinal deformation (Z1) of the product is calculated according to the determined stress model (C3), a corrective value (T1', T2') for the first longitudinal tension measurement value (T1) is calculated at at least one evaluation point (M1, M2) as a function of the longitudinal deformation correction factor (Z1), a corrected flatness measurement value (PC) is calculated at at least one of the evaluation points (M1, M2), taking the corrective value into consideration.

The moving strip is kept under tension here between a leveling or rolling unit (3) upstream of the measuring roller (RM) and/or another tensioning unit (4) downstream of the measuring roller (RM).

Because the stress model (known for each material) is taken into account in calculating the longitudinal deformation correction factor, the longitudinal tension value initially skewed by nonlinear effects of deformation/stress under plastic and/or elastoplastic conditions, can thus be corrected for in a very precise manner. As a result, the corrected flatness measurement value (PC) is also a very true, and therefore more precise, value regarding the state of flatness of the strip.

In one preferred implementation of the method according to the invention, it is also possible for an additional corrective factor to be applied to the calculation of the corrected flatness measurement value (PC) by taking account of dimensional coordinates pertaining to positioning in relation to rolling or leveling units (3), measuring units (2) and tensioning units (4), such as spacings (L1, L2, etc.) between the units. In that way, intermediate effects of deformation between the units can be corrected for in a refined manner by taking these into consideration when calculating the longitudinal deformation correction factor.

Advantageously, the method according to the invention plans for the corrected flatness measurement value (PC), corrected by means of a correction module (7), to be transmitted to a product flatness control module (8). The flatness control module (8) controls the settings of flatness actuators of a leveling or rolling unit (3), ideally positioned upstream of the flatness measurement assembly (2). It is then possible, by means of the flatness control module coupled with the actuators of a flatness correction installation, such as a rolling mill stand or other installation such as a leveling machine situated just upstream of the measuring roller, to adjust a transverse flatness target curve for the true transverse flatness desired on leaving the leveling or rolling installations, or even such as upstream or downstream of the flatness measurement assembly, even if the strip exhibits plastic or elastoplastic properties.

FIG. 4 thus depicts a first simple embodiment in the form of a device for measuring the flatness of a metal product (1) in the form of a strip moving along under tension, the product has at least plastic or elastoplastic deformation properties. That device comprises a flatness measurement assembly (2) of the type that deflects the product. In this instance, the assembly comprises a single measuring roller (RM) that causes the product to be deflected in the longitudinal direction. The device comprises a flatness measurement correction module (7) from which at least one corrected flatness measurement value for said product is transmitted as it passes over at least the measuring roller. The corrected value being obtained by implementing the measurement method according to the invention.

The method thus enables a local evaluation (M1) of the flatness of the product. That evaluation is situated at a point upstream of the measuring roller (RM) being calculated by taking into consideration at least the corrected flatness measurement value associated with the measuring roller derived from the first longitudinal tension measurement value (T1) combined with the first corrective factor (Z1).

The method thus also allows a local evaluation (M2) of the flatness of the product. That evaluation is situated at a point downstream of the measuring roller (RM) and is calculated by taking into consideration the corrected flatness measurement value associated with the measuring roller and derived from the first longitudinal tension measurement value (T1) combined with the first corrective factor (Z1).

Figure 5:
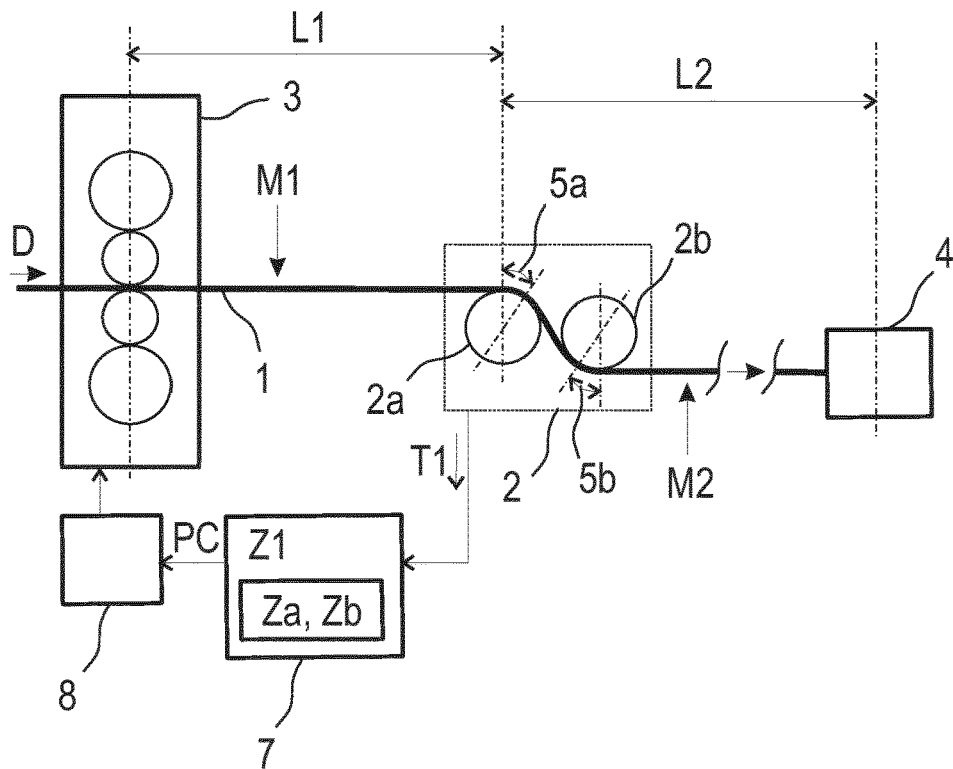
FIG. 5: shows a second embodiment for one implementation of the method according to the invention.

FIG. 5 depicts a second embodiment in the form of a device for measuring the flatness of a metal product (1) in the form of a strip moving along under tension according to FIG. 4, wherein the product has at least plastic or elasto-plastic deformation properties.

Unlike the device in FIG. 4, this flatness measurement assembly (2) is of the type that deflects the product twice. It ideally comprises (at least) a first measuring roller (2a or 2b) that causes the product to be deflected in the longitudinal direction, and also comprises at least one second deflecting roller downstream or upstream of the measuring roller so that the strip is deflected to be parallel (in this instance horizontal) as the strip enters and leaves the assembly (2).

The device also comprises a flatness measurement correction module (7) from which at least one corrected flatness measurement value for the product as it passes (5a or 5b) over at least the measuring roller is transmitted, wherein the corrected value is obtained by implementing any of the measurement methods disclosed herein.

Use of this second flatness measurement device according to FIG. 5, may cause one of two scenarios which may arise:

a) In one embodiment, the second deflecting roller (2a) is positioned upstream of the measuring roller (2b).

This method thus allows a local evaluation (M1) of the flatness of the product, wherein that the evaluation is situated at a point upstream of the measuring roller (2b) and is calculated by taking into consideration:

the corrected flatness measurement value associated with the measuring roller derived from the first longitudinal tension measurement value (T1) combined with the first corrective factor (Z1; Zb), and each intermediate corrected flatness value induced by, where there is one, at least one deflecting roller such as (2a) positioned upstream of the measuring roller and downstream of the local evaluation point (M1), wherein the deflecting roller imposes at least a second corrective factor (Za) on the first corrective factor (Z1; Zb).

The method also allows a local evaluation (M2) of the flatness of the product, wherein that evaluation is situated at a point downstream of the measuring roller (2b) and that evaluation is calculated by taking into consideration:

the corrected flatness measurement value associated with the measuring roller derived from the first longitudinal tension measurement value (T1) combined with the first corrective factor (Z1; Zb), b) In the other embodiments, the second deflecting roller (2b) is positioned downstream of the measuring roller (2a).

This method thus allows a local evaluation (M1) of the flatness of the product, because the evaluation is situated at a point upstream of the measuring roller (2a) and is calculated by taking into consideration:

the corrected flatness measurement value associated with the measuring roller derived from the first longitudinal tension measurement value (T1) combined with the first corrective factor (Z1; Za), This method also allows a local evaluation (M2) of the flatness of the product, because the evaluation is situated at a point downstream of the measuring roller (2a) and is calculated by taking into consideration:

the corrected flatness measurement value associated with the measuring roller derived from the first longitudinal tension measurement value (T1) combined with the first corrective factor (Z1; Za), each intermediate corrected flatness value induced by, at least one deflecting roller, where there is one, such as the roller (2b) in this instance positioned downstream of the measuring roller and upstream of the local evaluation point (M2), said deflecting roller imposing at least a second corrective factor (Zb) on the first corrective factor (Z1; Za).

As a result, the flatness measurement device according to FIG. 5 provides at least one second deflecting roller (2b or 2a) to be positioned upstream or downstream of the measuring roller (2a or 2b).

If at least the second deflecting roller is positioned downstream of the measuring roller, that deflecting roller induces a second corrected flatness value to be taken into consideration in calculating the corrected value transmitted to the correction module (7) if the deflecting roller is positioned upstream of a product flatness evaluation point (M2).

If at least the second deflecting roller is positioned upstream of the measuring roller, at least the deflecting roller induces a second corrected flatness value to be taken into consideration in calculating the corrected value transmitted to the correction module (7) if the deflecting roller is positioned downstream of a product flatness evaluation point (M1).

Figure 6:
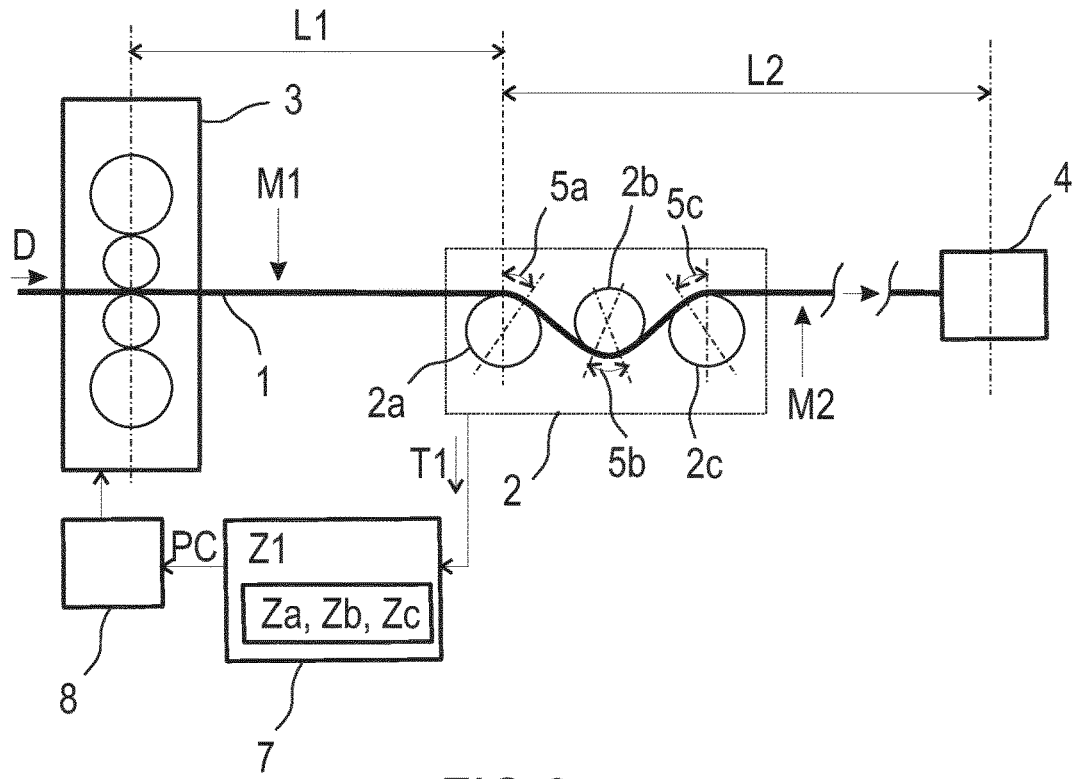
FIG. 6: shows a third embodiment for one implementation of the method according to the invention.

FIG. 6 finally depicts a third embodiment in the form of a device for measuring the flatness of a metal product (1) in the form of a strip moving along under tension according to FIG. 4 or 5, said product having at least plastic or elasto-plastic deformation properties.

Unlike the devices in FIG. 4 or 5, the flatness measurement assembly (2), of the type that deflects the product three times, ideally comprises (at least) a first measuring roller (2b) that causes the product to be deflected in the longitudinal direction, and also comprises at least a second and a third deflecting roller (2a, 2c) upstream and downstream of the measuring roller so that the strip is parallel (in this instance horizontal) as it enters and leaves the assembly (2), ideally with the line along which it passes remaining at a constant height.

The device also comprises a flatness measurement correction module (7) from which at least one corrected flatness measurement value for the product as it passes (in this instance 5b) over at least the measuring roller (2b) is transmitted, wherein the corrected value is obtained by implementing the measurement method according to the invention.

In a similar way to the instances depicted in FIG. 5, the measuring roller could be positioned in place of one of the other deflecting rollers (2a, 2c), in which case the principle for locally (M1, M2) evaluating the flatness of the product would be able to be deduced from the evaluation example hereinbelow.

In this regard, the device may advantageously plan that:
at least the second deflecting roller is positioned upstream or downstream of the measuring roller;

at least the third deflecting roller is positioned downstream or upstream of the measuring roller;

if at least one of the second and/or third deflecting rollers is positioned downstream of the measuring roller, at least the deflecting roller induces a second and/or third corrected flatness value to be taken into consideration in calculating the corrected value transmitted to the correction module (7) if the deflecting roller is positioned upstream of a product flatness evaluation point (M2);

if at least one of the second and/or third deflecting rollers is positioned upstream of the measuring roller, at least the deflecting roller induces a second and/or third corrected flatness value to be taken into consideration in calculating the corrected value transmitted to the correction module (7) if the deflecting roller is positioned downstream of a product flatness evaluation point (M1).

According to these features, all the configurations of devices, through permutations of the types of deflecting or measuring rollers, are described according to FIG. 6:

Measuring roller (2*a*), second deflecting roller (2*b*), third deflecting roller (2*c*);
Measuring roller (2*b*), second deflecting roller (2*a*), third deflecting roller (2*c*);
Measuring roller (2*c*), second deflecting roller (2*a*), third deflecting roller (2*b*).

The method implemented according to FIG. 6 thus allows a local evaluation (M1) of the flatness of the product, wherein the evaluation is made at a point upstream of the measuring roller (2*b*) and is calculated by taking into consideration:

the corrected flatness measurement value associated with the measuring roller (2*b*) derived from the first longitudinal tension measurement value (T1) combined with the first corrective factor (Z1; Zb), and each intermediate corrected flatness value induced by at least one deflecting roller (2*a*) positioned upstream of the measuring roller and downstream of the local evaluation point (M1), where there is at least one such deflecting roller, imposing at least a second corrective factor (Za) on the first corrective factor (Z1; Zb).

The method also enables a local evaluation (M2) of the flatness of the product to be made at a point downstream of the measuring roller (2*b*) and that evaluation is calculated by taking into consideration:

the corrected flatness measurement value associated with the measuring roller and derived from the first longitudinal tension measurement value (T1) combined with the first corrective factor (Z1; Zb), and each intermediate corrected flatness value induced by at least one deflecting roller (2*b*, 2*c*) positioned downstream of the measuring roller and upstream of the local evaluation point (M2), wherein the third deflecting roller (2*c*) imposes at least a third corrective factor (Zc) on the first corrective factor (Z1; Zb).

In summary, for the latter instances derived from the examples in FIGS. 5 and 6 and in comparison with the example in FIG. 4, the first corrective factor (Z1) is thus itself corrected by one or more other corrective factors according to the method described herein under the effect of an additional deformation by at least one deflecting roller additionally positioned upstream or downstream of the measuring roller, and the additional deformation itself imposing non-linear deformations/stresses on the strip of plastic or elastoplastic type.

In all of the embodiments of a device for implementing the method according to the invention, the corrected value for the exact and local flatness measurement (PC) calculated by means of the corrective factors (Z1, Za, Zb, Zc), is transmitted to a product flatness control module (8). The flatness control module (8) controls the settings of flatness actuators of a leveling or rolling unit (3), which is ideally positioned upstream of the flatness measurement assembly (2). It then follows that the settings of the leveling or rolling unit (3) are better set because of the more precise measurement of the flatness at the exit of the rolling unit (3). Finally, the product of plastic or elastoplastic type entering the leveling or rolling unit (3) will therefore be better leveled or rolled.

The method according to the invention and the associated device are not restricted to there being no, one, or two deflecting roller(s) in addition to the measuring roller. It is of course possible to provide three or more deflecting rollers, in which case the embodiments of the method and of the device according to the invention as set out hereinabove can be readily deduced.

The invention claimed is:

1. A method for correcting flatness of a metal product in a form of a strip traveling along a path, the strip having a length, a width, and a thickness transverse to the length and the width of the strip, the method comprising:

moving the strip along the path under tension applied to the strip over a flatness measurement assembly configured to deflect the strip, wherein the flatness measurement assembly comprises at least one measuring roller (RM) that causes the strip to be deflected along its direction of travel on the path in a deflection zone;

measuring a first longitudinal tension value (T1) of the strip in the deflection zone with the measuring roller, wherein the strip has at least plastic or elastoplastic deformation properties;

while the strip is moving along the path, determining stress in the thickness direction of the strip with a stress model for the strip over the thickness of the strip as a function of conditions of plastic or elastoplastic deformation of the strip on the measuring roller in the deflection zone while the strip is under tension;

while the strip is moving along the path, calculating a longitudinal deformation correction factor for the longitudinal deformation of the strip using the stress in the thickness direction determined with the stress model for the strip, the calculated correction factor being useful for correcting an error in the first longitudinal tension measurement value due to nonlinear effects of deformation/stress under plastic and/or elastoplastic conditions;

while the strip is moving along the path, calculating a corrected value for the first longitudinal tension measurement value at at least one evaluation point as a function of the longitudinal deformation correction factor;

while the strip is moving along the path, calculating a corrected flatness measurement value at at least one of the evaluation points (M1, M2), taking the corrected value into consideration;

while the strip is moving along the path, transmitting the corrected flatness measurement value to a product flatness control module; and while the strip is moving along the path, controlling, with the flatness control module, the flatness of the strip.

2. The method as claimed in claim 1, further comprising:
applying an additional corrective factor to the calculation of the corrected flatness measurement value by taking account of dimensional coordinates pertaining to positioning in relation to rolling or leveling units for the strip, the measuring assembly comprising measuring units and tensioning units in spacings between the measuring units.

3. The method as claimed in claim 1, wherein the flatness control module controls the flatness of the strip by controlling settings of flatness actuators of a leveling or rolling unit positioned upstream in the traveling path of the flatness measuring assembly.

4. The method as claimed in claim 1, further comprising:
calculating a local evaluation of the flatness of the strip situated at a point upstream of the measuring roller, taking into consideration:
the corrected flatness measurement value associated with the measuring roller and derived from the first longitudinal tension measurement value (T1) combined with the first corrective factor (Z1=Za or Zb),
and each intermediate corrected flatness value induced by, at least one deflecting roller positioned upstream of the measuring roller and downstream of the local evaluation point on the traveling path, the deflecting roller imposing at least a second corrective factor on the first corrective factor.

5. The method as claimed in claim 1, further comprising:
calculating a local evaluation (M2) of the flatness of the strip at a point downstream of the measuring roller is, taking into consideration:
the corrected flatness measurement value associated with the measuring roller and derived from the first longitudinal tension measurement value combined with the first corrective factor; and
and each intermediate corrected flatness value induced by at least one deflecting roller positioned downstream of the measuring roller and upstream of the local evaluation point, the deflecting roller imposing at least a third corrective factor on the first corrective factor.

6. A device for measuring flatness of a metal product in the form of a strip traveling along a path under tension, the strip having a length, a width, and a thickness transverse to the length and the width of the strip, the product having at least plastic or elastoplastic deformation properties, the device comprising:
a flatness measurement assembly configured to deflect the strip along the path;
the measurement assembly comprising at least one measuring roller (RM) configured to cause the strip to be deflected in a longitudinal direction along the path and in a deflection zone and comprising a flatness measurement correction module with which at least one corrected flatness measurement value of the strip is calculated as the strip passes over at least the measuring roller by,
receiving a measured first longitudinal tension value (T1) of the strip in the deflection zone;

determining stress in the thickness direction of the strip with a stress model for the strip over the thickness of the strip as a function of conditions of plastic or elastoplastic deformation of the strip on the measuring roller in the deflection zone while the strip is under tension;
calculating a longitudinal deformation correction factor for the longitudinal deformation of the strip using the stress in the thickness direction determined with the stress model for the strip, the calculated correction factor being useful for correcting an error in the first longitudinal tension measurement value due to nonlinear effects of deformation/stress under plastic and/or elastoplastic conditions;
calculating a corrected value for the first longitudinal tension measurement value at at least one evaluation point as a function of the longitudinal deformation correction factor; and
calculating a corrected flatness measurement value at at least one of the evaluation points (M1, M2), taking the corrected value into consideration;
wherein the device is configured to transmit the corrected flatness measurement value to a product flatness control module.

7. The flatness measurement device as claimed in claim 6, further comprising at least one second deflecting roller positioned upstream or downstream of the measuring roller.

8. The flatness measurement device as claimed in claim 7, further comprising at least one third deflecting roller positioned downstream or upstream of the measuring roller.

9. The flatness measurement device as claimed in, claim 8, wherein at least one of the second or third deflecting rollers is positioned downstream of the measuring roller, and the at least one of the deflecting rollers induces a respective one of a second or third corrected flatness value to be taken into consideration in calculating the corrected value transmitted to the correction module if the at least one of the deflecting rollers is positioned upstream of a product flatness evaluation point.

10. The flatness measurement device as claimed in claim 8, wherein at least one of the second or third deflecting rollers is positioned upstream of the measuring roller, that at least one of the deflecting rollers induces a respective one of a second or third corrected flatness value to be taken into consideration in calculating the corrected value transmitted to the correction module if the at least one of the deflecting rollers is positioned downstream of a product flatness evaluation point.

11. The device as claimed in claim 6, wherein the flatness control module is configured to control the settings of flatness actuators of a leveling or rolling unit positioned upstream in the traveling path of the flatness measurement assembly.

12. The method as claimed in claim 1, wherein the at least plastic or elastoplastic deformation properties of the strip comprise tension and compression of the strip in a thickness direction of the strip as the strip is deflected.

* * * * *